United States Patent [19]

Williams

[11] Patent Number: 4,850,382

[45] Date of Patent: Jul. 25, 1989

[54] WORK BOOTH FOR A ROBOT

[75] Inventor: Donald P. Williams, Rockford, Ill.

[73] Assignee: Barnes Drill Co., Rockford, Ill.

[21] Appl. No.: 244,790

[22] Filed: Sep. 14, 1988

[51] Int. Cl.$^4$ ............................ B08B 3/02; B08B 9/08
[52] U.S. Cl. .................................... 134/167 R; 52/64;
    98/115.4; 118/323; 118/326; 134/172; 414/8;
    901/43
[58] Field of Search ............... 134/167 R, 168 R, 172,
    134/177, 180, 181; 98/115.2, 115.4; 414/8;
    901/16, 43; 52/64; 118/323, 326

[56] References Cited

U.S. PATENT DOCUMENTS

| | | | |
|---|---|---|---|
| 2,840,038 | 6/1958 | Verba | 118/323 |
| 3,791,393 | 2/1974 | Baldwin | 134/167 R |
| 4,156,367 | 5/1979 | Pardo et al. | 901/16 X |
| 4,781,517 | 11/1988 | Pearce et al. | 901/16 X |

FOREIGN PATENT DOCUMENTS 28222 4/1931 Australia ................................. 52/64

Primary Examiner—Philip R. Coe
Attorney, Agent, or Firm—Leydig, Voit & Mayer

[57] ABSTRACT

A booth in which components are cleaned by high pressure water ejected from a nozzle assembly associated with a robot. The robot is adapted to move the nozzle assembly along multiple axes so as to enable the nozzle assembly to reach various areas of the components to be cleaned. The nozzle assembly and part of the robot are located in the booth but substantial portions of the robot are located outside of the booth in order to avoid the need for waterproofing those portions. To enable the robot to operate while located partially within and partially outside of the booth, one wall of the booth is formed by groups of slidable panels which expand and contract to accommodate the robot as the robot is moved. In one embodiment, the panels form the ceiling of the booth and, in a second embodiment, the panels define one upright side wall of the booth.

7 Claims, 4 Drawing Sheets

WORK BOOTH FOR A ROBOT

BACKGROUND OF THE INVENTION

This invention relates generally to a work booth and to a tool for performing one or more operations on a component located within the booth. More particularly, the invention relates to apparatus in which the tool is carried by a multi-axis robot and in which the environment inside of the booth is hostile to the robot.

One example of such apparatus involves a booth in which car body carriers are sprayed with high pressure water in order to remove paint flakes and chips from the carriers. In prior arrangements, the entire robot has been located within the booth and exposed to the water. As a result, it has been necessary to protect and waterproof drive motors, encoders and other key components of the robot.

SUMMARY OF THE INVENTION

The general aim of the present invention is to reduce the complexity of apparatus of the above type by locating many of the components of the robot outside of the booth so as to eliminate the need for special waterproofing and protection of such components. In addition, the volume of the booth itself may be reduced since the booth need not house the entire robot.

A more detailed object of the invention is to achieve the foregoing by locating the gantry of a robot outside of the booth and by projecting the mast or the boom of the robot into the booth through an opening defined between groups of slidable panels. When the gantry is moved, the panels collapse and expand to permit movement of the mast or boom.

The invention also resides in the unique arrangement of four groups of slidable panels in such a manner as to permit free movement of the mast or boom along two mutually perpendicular axes.

These and other objects and advantages of the invention will become more apparent from the following detailed description when taken in conjunction with the accompanying drawings.

DETAILED DESCRIPTION OF THE PREFERRED EMBODIMENTS

Figure 1:
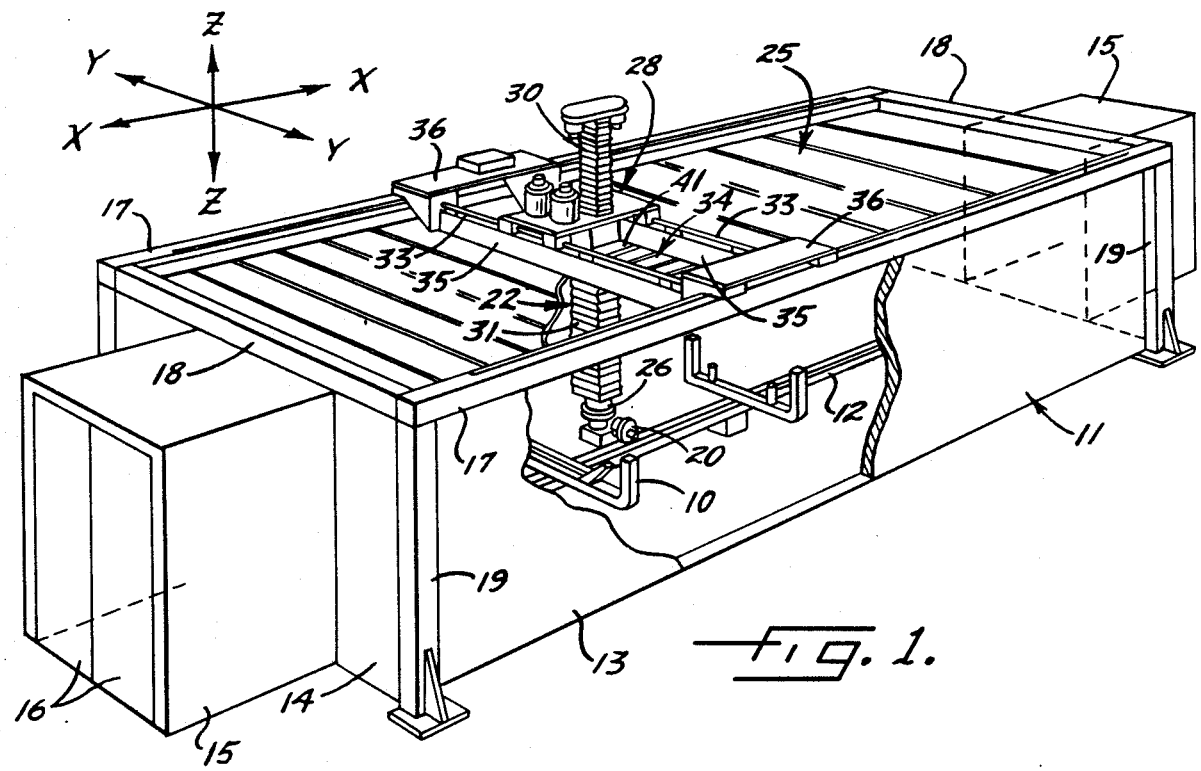
FIG. 1 is a perspective view of one embodiment of a new and improved booth and robot incorporating the unique features of the present invention.

For purposes of illustration, the invention has been shown in the drawings as embodied in apparatus for performing a work operation on an object or component 10. In this particularly instance, the component 10 has been shown as being a carrier for a car body. The carrier 10 is used to support the body as the latter is moved through a paint shop.

A major source of fresh paint contamination in the paint shop is the flaking of baked and dried material from the carrier to the newly painted body. To reduce such contamination, it has become conventional practice to wash the carriers at frequent intervals and with a high pressure water spray.

In one system for washing the carriers 10, the carriers are advanced through a booth 11 by an inverted power-and-free conveyor 12 and are washed with a high pressure water spray during such advance. One embodiment of a booth is shown in FIG. 1 and defines a box-like work chamber. Thus, the booth includes rectangular side walls 13 extending in the direction of travel of the conveyor 12. Transversely extending end walls 14 are located at the ends of the side walls and are disposed adjacent vestibules 15 which are equipped with air-operated doors 16. Frame members 17 extend along the tops of the side walls 13 while frame members 18 extend along the tops of the end walls 14. The frame members are supported by vertical legs 19 located at the corners of the booth.

Washing of the carriers 10 is effected by a tool in the form of a high pressure spray nozzle assembly 20 located in the booth 11 and adapted to be moved to various positions by a multi-axis robot 22. Referring to FIG. 1, the robot 22 is capable of moving the nozzle assembly 20 lengthwise of the booth 11 along an X-axis, is capable of moving the nozzle assembly transversely of the booth along a Y-axis and is capable of moving the nozzle assembly upwardly and downwardly along a Z-axis. In addition, the nozzle assembly may be rotated and swiveled about the Z-axis, thereby giving the nozzle assembly the capability of movement about five axes.

In accordance with the present invention, the nozzle assembly 20 and part of the robot 22 are located inside of the booth 11 while the remainder of the robot is located outside of the booth. The top wall or ceiling 25 of the booth is uniquely constructed to seal that part of the robot 22 which is outside of the booth from the environment in the booth while still permitting the robot to move the nozzle assembly 20 along and about the various axes.

Figure 3:
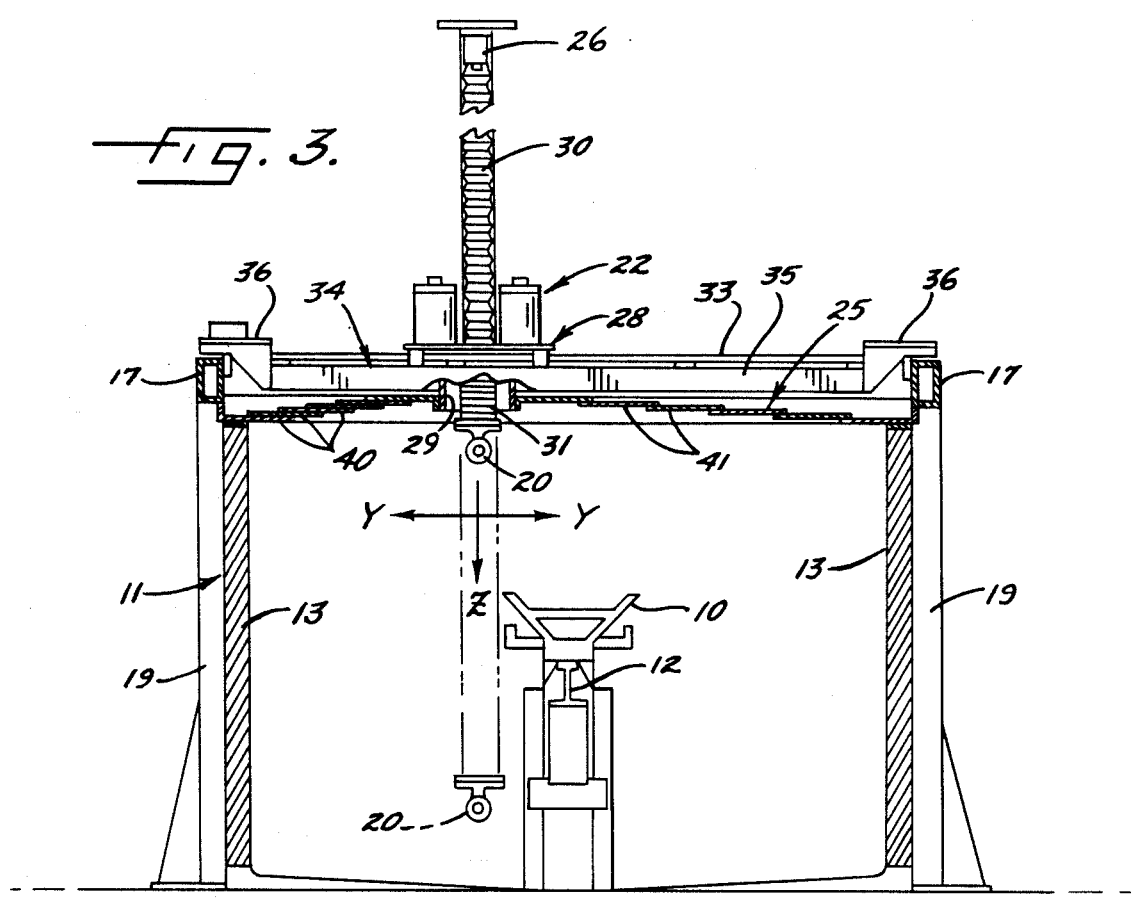
FIG. 3 is an enlarged cross-section taken substantially along the line 3—3 of FIG. 2.
Figure 4:
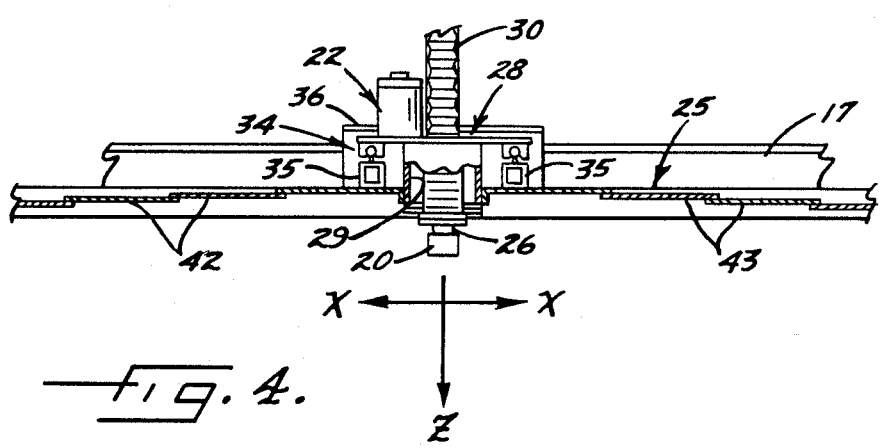
FIG. 4 is an enlarged fragmentary cross-section taken substantially along the line 4—4 of FIG. 2.
Figure 5:
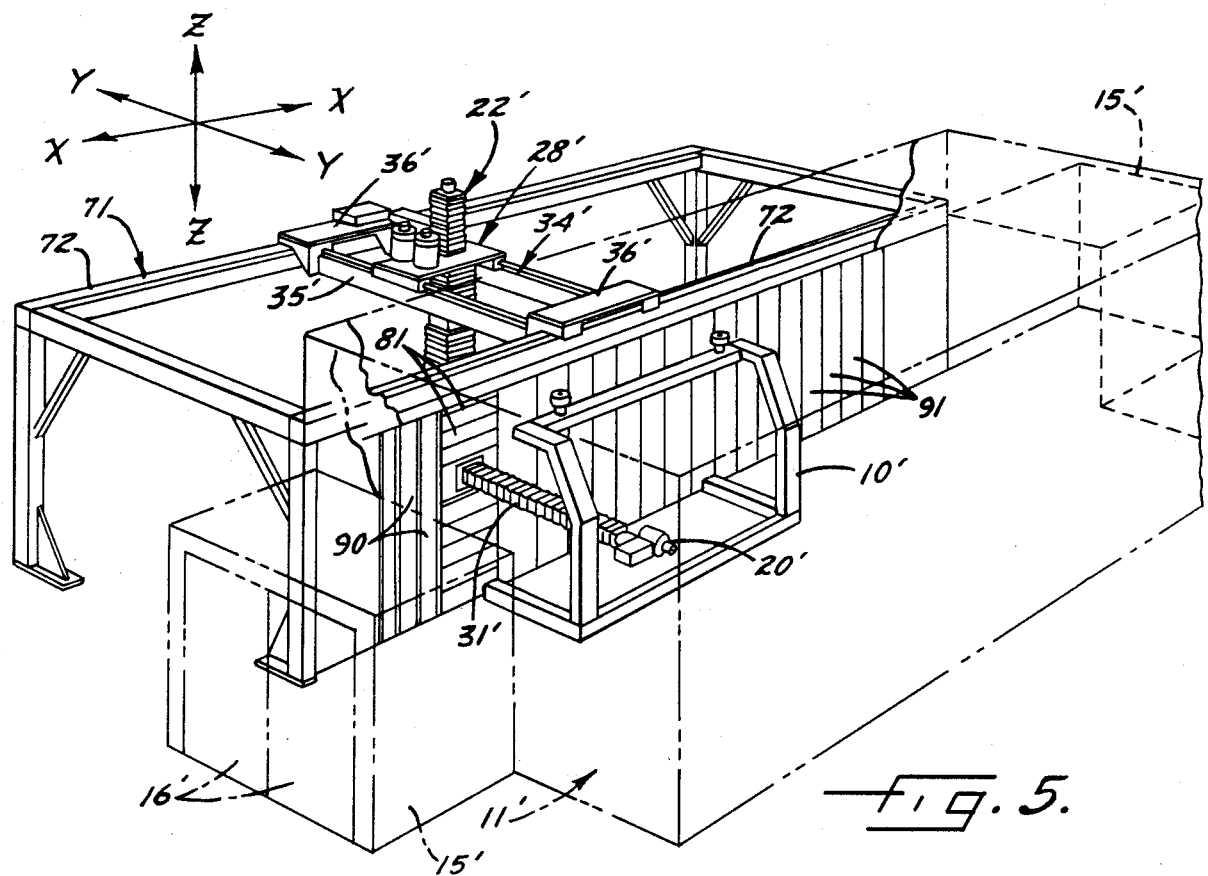
FIG. 5 is a perspective view of another embodiment of a booth and robot incorporating the features of the invention.
Figure 6:
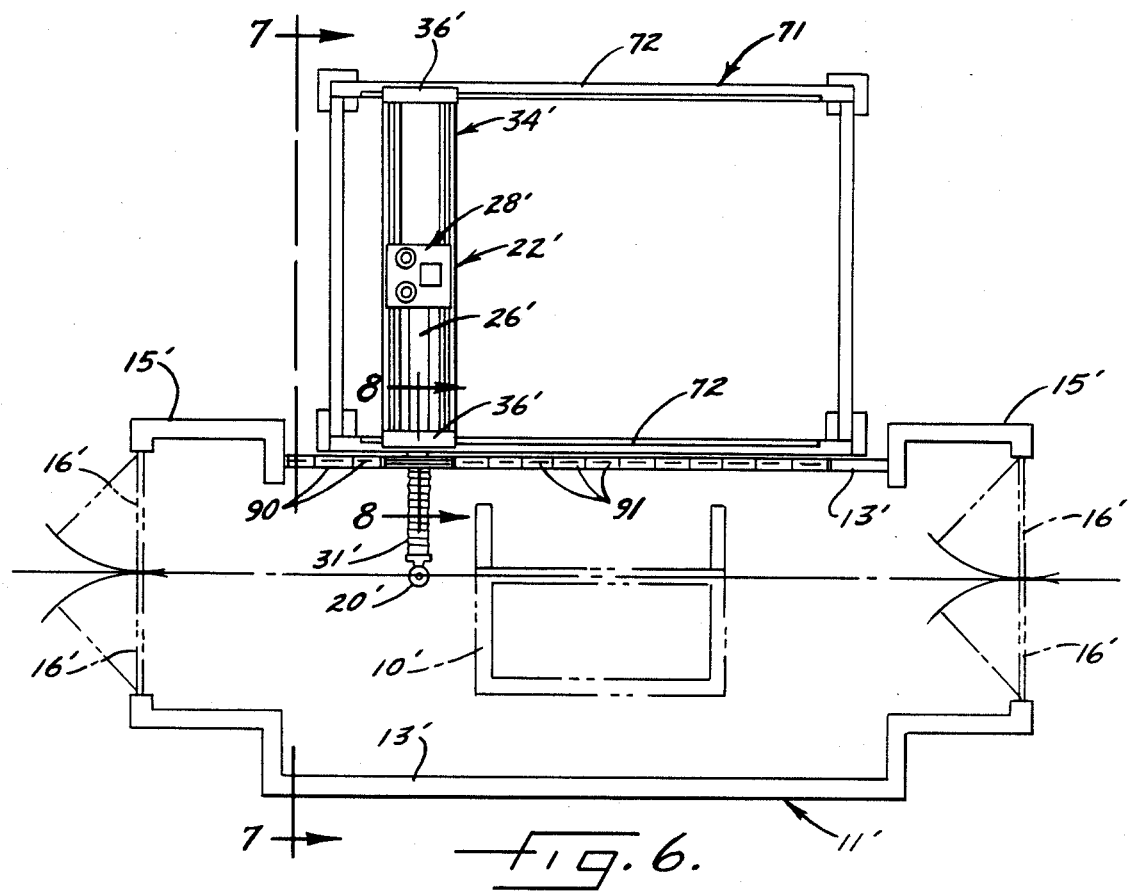
FIG. 6 is a top plan view of the booth and robot shown in FIG. 5.

The robot 22 itself is of substantially conventional construction and includes nozzle mounting means in the form of a vertically extending mast 26 (FIG. 4). The nozzle assembly 20 is carried on the lower end of the mast and is supported on the mast to rotate about a vertical axis as well as to swivel. In order to enable the nozzle assembly to spray various areas of the carrier 12, the mast 26 is supported to move vertically along the Z-axis between a raised position shown in solid lines in FIG. 3 and a lowered position shown in phantom lines.

Supporting the mast 26 for up and down movement is a carriage 28 (FIG. 3) having a depending sleeve 29 which surrounds part of the mast. Upper and lower protective bellows 30 and 31 surround the mast and engage the upper and lower sides, respectively, of the carriage 28. The bellows expand and contract when the mast is moved upwardly and downwardly relative to the carriage.

As shown in FIG. 1, the carriage 28 is supported to move back and forth along the Y-axis by a pair of transversely extending guide rods 33 which form part of a second carriage 34 having struts 35 underlying the guide rods. Saddles 36 at the ends of the guide rods and struts rest slidably on the upper frame members 17 and support the carriage 34 for back and forth movement along the X-axis.

With the foregoing arrangement, the nozzle assembly 20 may be moved along the Y-axis and shifted transversely of the body carrier 10 by moving the carriage 28 relative to the carriage 34 along the guide rods 33. When the carriage 34 is shifted along the frame members 17 in the direction of the X-axis, the carriage 28 also is shifted along that axis and causes the nozzle assembly 20 to move longitudinally of the body carrier 10.

In carrying out the invention, the ceiling 25 of the booth 11 is constructed to permit the carriages 18 and 34 to move in the manner described above and, at the same time, to seal around the carriages to prevent water and other contaminants from escaping from the booth 11. For this purpose, the ceiling is defined by a first group of collapsible panels 40 located on one side of the carriage 28, by a second group of collapsible panels 41 located on the opposite side of the carriage 28, by a third group of collapsible panels 42 located on one side of the carriage 34 and by a fourth group of collapsible panels 43 located on the opposite side of the carriage 34.

Figure 2:
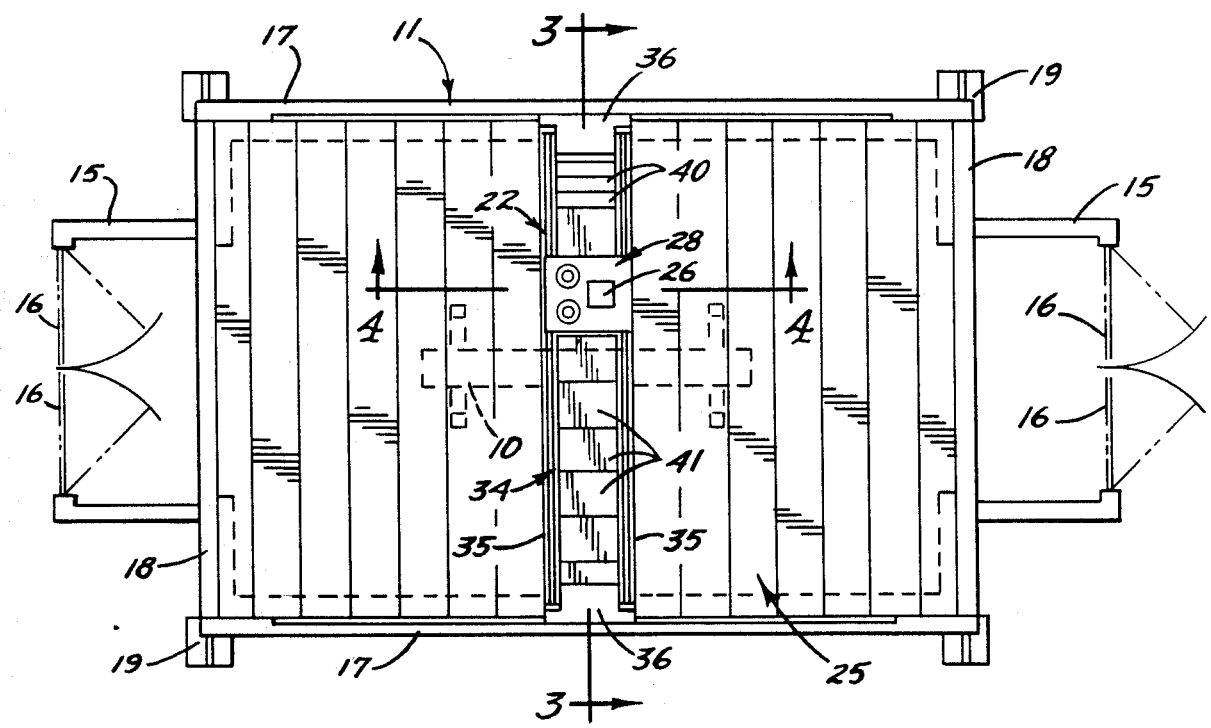
FIG. 2 is a top plan view of the booth and robot shown in FIG. 1.

The panels 40 are slidably supported by the carriage 34 and extend from the left side (FIG. 3) of the sleeve 29 on the carriage 28 to the left end of the carriage 34. The panels 41 are similarly supported by the carriage 34 and extend from the right side of the sleeve 29 to the right end of the carriage 34. As shown most clearly in FIG. 2, the panels 40 and 41 span the full distance between the struts 35 of the carriage 34.

The panels 42 are supported by the frame members 17 and extend from the left side (FIG. 4) of the sleeve 29 on the carriage 28 to the left frame member 18. In a similar manner, the panels 43 extend from the right side of the sleeve 29 to the right frame member 18 and are slidably supported by the frame members 17. The panels 42 and 43 extend across the full distance between the frame members 17.

The panels 40, 41, 42 and 43 are made of stainless steel and are telescoping waycovers of the type sold by Hennig, Inc. of Rockford, Illinois. The panels expand apart when they are pulled away from one another and contract or stack upon one another when pushed together.

With the foregoing arrangement, the top 25 of the booth 11 is completely sealed by the carriages 28 and 34 and by the panels 40, 41, 42 and 43. When the carriage 28 is moved along the Y-axis from left to right (FIG. 3), the sleeve 29 pulls on the panels 40 and causes those panels to expand. At the same time, the sleeve pushes on the panels 41 and causes the latter panels to stack on top of one another. When the carriage 28 is shifted in the opposite direction along the Y-axis, the panels 41 expand and the panels 40 contract. Thus, the panels 40 and 41 accommodate movement of the carriage 28 along the Y-axis while keeping the booth 11 in a sealed condition.

In a similar manner, the panels 42 are pushed together by the left side (FIG. 4) of the sleeve 29 and by the left strut 35 of the carriage 34 when the latter is moved from right to left along the X-axis. As the panels 42 contract, the panels 43 expand. Conversely, the panels 42 expand and the panels 43 contract when the carriage 34 is moved from left to right along the X-axis. Thus, the panels 42 and 43 keep the spaces between the frame members 18 and the struts 35 in a sealed condition at all times.

By virtue of the panels 40, 41, 42 and 43, the carriages 28 and 34 and certain ones of the drive motors, encoders and other components of the robot 22 may be located completely outside of the booth 11 and are not exposed to the water and paint chips in the booth. As a result, there is no need to provide expensive waterproofing protection for those components. Moreover, since a substantial portion of the robot 22 is located above the booth, the interior volume of the booth may be reduced. This results in a savings of floor space and enables the use of a smaller air makeup and circulating system for the booth.

Another embodiment of the invention as shown in FIGS. 5 to 8 in which parts corresponding generally to those of the first embodiment are indicated by the same but primed reference numerals. In the embodiment of FIGS. 5 to 8, the ceiling 25' (FIG. 7) of the booth 11' is solid and the robot 22' is located alongside and extends through one of the side walls 13' of the booth.

Figure 7:
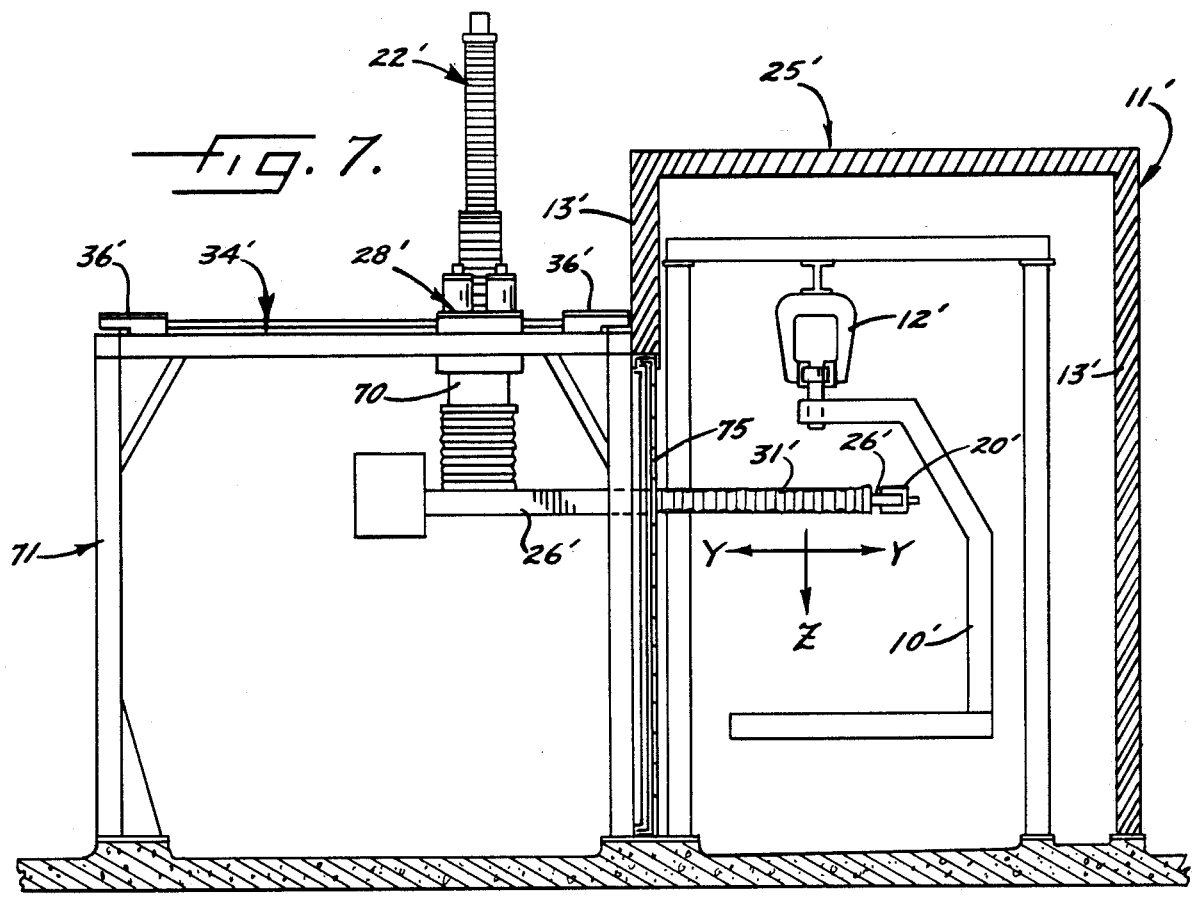
FIG. 7 is an enlarged cross-section taken substantially along the line 7—7 of FIG. 6.

As shown in FIG. 7, the body carrier 10' is supported by an overhead power-and-free conveyor 12' located in the booth 11'. The spray nozzle assembly 20' is carried on one end of a nozzle mounting means in the form of a horizontally extending boom 26' having a bellows 31'. One end portion of the boom 26' is located inside of the booth 11' while the other end portion of the boom is located outside of the booth. The latter end portion is connected to a first carriage 70 (FIG. 7) which is supported by a second carriage 28' to move upwardly and downwardly. Upward and downward movement of the carriage 70 causes the boom 26' and the nozzle assembly 20' to move upwardly and downwardly along the Z-axis.

The carriage 28' is substantially identical to the carriaage 28 and is supported to move backe and forth along the Y-axis by a carriage 34'. The carriage 34' is supported to move back and forth along the X-axis by a frame 71 (FIG. 5) located outside of the booth 11' and having longitudinally extending frame members 72 for slidably supporting the saddles 36' of the carriage 34'.

Figure 8:
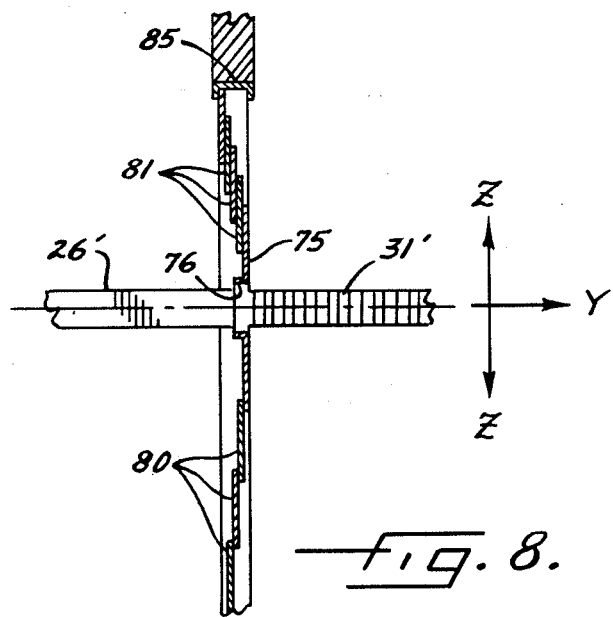
FIG. 8 is an enlarged fragmentary cross-section taken substantially along the line 8—8 of FIG. 6.

As shown in FIG. 8, a plate 75 is located near the bellows 31' and is formed with an opening 76 for accommodating the boom 26'. The plate 75 enables the carriage 28' to move the boom within the opening and along the Y-axis.

The plate 75 is located between a first group of horizontally extending panels 80 and a second group of horizontally extending panels 81. The panels 80 and 81 are located in a vertical plane within a rectangular framework 85. When the carriage 70 is shifted upwardly, the panels 80 expand vertically and the panels 81 collapse. Downward movement of the carriage 70 results in vertical collapsing of the panels 80 and expansion of the panels 81. The plate 75 moves upwardly and downwardly whenever the carriage 70 moves upwardly and downwardly and thus the plate 75 may be considered to be part of the carriage 70.

The framework 85 is located between a group of vertically extending panels 90 (FIG. 1 and a group of vertically extending panels 91. Whenever the carriage 34' is moved from left to right along the X-axis, the framework 85 causes the panels 90 to expand and the panels 91 to collapse. Reverse movement of the carriage 34' causes the framework 85 to push the panels 90 together and to pull the panels 91 apart. Insofar as the framework 85 moves in unison with the carriage 34', it may be considered to be part of such carriage.

The embodiment of FIGS. 5 to 8 achieves the same advantages as that of FIGS. 1 to 4 in that a substantial part of the robot 22' is located outside of the booth 11' and is protected from the water and contaminants in the booth. Thus, the need for special protection for the robot is reduced.

I claim:

1. The combination of a work booth, and a tool for working on objects located in the booth, said booth having a plurality of walls defining a work chamber, said tool being located in said chamber, mounting means connected to said tool and extending outwardly through one of said walls, said mounting means being supported for linear movement along first and second generally perpendicular axes, said one wall being defined at least in part by four groups of panels, a first two of said groups of panels being spaced from one another along said first axis, the other two of said groups of panels being spaced from one another along said second axis, the panels of each group being connected together so as to stack upon one another when pushed toward one another and to expand apart when pulled away from one another, said mounting means being located such that the panels of one group stack upon one another and the panels of another group expand apart whenever said mounting means are moved in either direction along either of said axes.

2. The combination defined in claim 1 further including first and second carriages located adjacent said one wall and supported for movement along said first and second axes, respectively, said tool mounting means being movable with said first carriage, said first carriage being movable relative to said second carriage along said first axis and being movable with said second carriage along said second axis, and the panels of said first two groups of panels stacking and expanding when said first carriage is moved along said first axis, and the panels of said other two of said groups of panels stacking and expanding when said second carriage is moved along said second axis.

3. The combination defined in claim 1 in which said one wall is a generally horizontal top wall, said panels being located in a generally horizontal plane with the panels of said first two groups extending substantially perpendicular to the panels of said other two groups.

4. The combination defined in claim 1 in which said one wall is a generally vertical side wall, said panels being located in a generally vertical plane with the panels of said first two groups extending generally perpendicular to the panels of said other two groups.

5. The combination of a work booth, and a tool for working on objects located in the booth, said booth having a plurality of walls defining a work chamber, said tool being located in said chamber, mounting means connected to said tool and extending outwardly through one of said walls, said mounting means being supported for back and forth linear movement along a first axis and for back and forth linear movement along a second axis extending substantially perpendicular to said first axis, said one wall being defined at least in part by first, second, third and fourth groups of panels, said first and second groups of panels being spaced from one another along said first axis and being located on opposite sides of said mounting means, said third and fourth groups of panels being spaced from one another along said second axis and being located on opposite sides of said mounting means, the panels of each group being connected together so as to stack upon one another when pushed toward one another and to expand apart when pulled away from one another, the panels of said first and second groups being operably associated with said mounting means such that the panels of said first group stack upon one another and the panels of said second group expand apart when said mounting means are moved in one direction along said first axis while the panels of said first group expand apart and the panels of said second group stack upon one another when said mounting means are moved in the opposite direction along said first axis, and the panels of said third and fourth groups being operable associated with said mounting means such that the panels of said third group stack upon one another and the panels of said fourth group expand apart when said mounting means are moved in one direction along said second axis while the panels of said third group expand apart and the panels of said fourth group stack upon one another when said mounting means are moved in the opposite direction along said second axis.

6. The combination defined in claim 5 in which said one wall is a generally horizontal top wall, said panels being located in a generally horizontal plane with the panels of said first and second groups extending substantially perpendicular to the panels of said third and fourth groups.

7. The combination defined in claim 5 in which said one wall is a generally vertical side wall, said panels being located in a generally vertical plane with the panels of said first and second groups extending substantially perpendicular to the panels of said third and fourth groups.

* * * * *